May 3, 1949.　　　　W. P. HORTON　　　　2,468,877
FISH BAIT
Filed Oct. 6, 1947
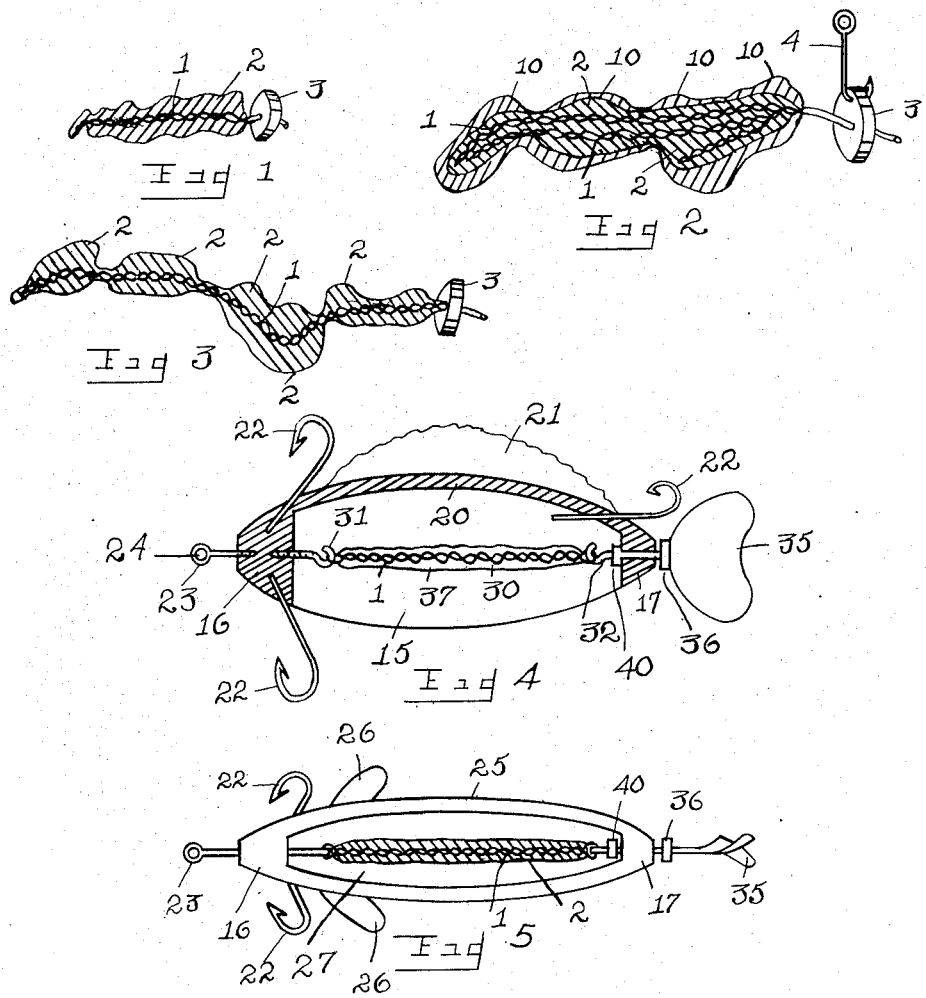
Inventor
William P. Horton
By Thomas L. Wilder
Attorney Patented May 3, 1949

2,468,877

UNITED STATES PATENT OFFICE 2,468,877

FISH BAIT

William P. Horton, Newburyport, Mass.

Application October 6, 1947, Serial No. 778,166

1 Claim. (Cl. 43—43)

My invention relates to a fish bait and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide a bait lure which will simulate a live bait such as a worm or minnow or frog or crawfish or other similar animal.

To this end the device employs a motor power in the form of a twisted rubber or elastomer strand which is inserted into a pliable shell or jacket resembling the body of the creature used for live fishing bait. The rubber strand motor is inserted in the shell or jacket in such manner as to give the shell or jacket the involuntary motions of a live creature, such as the wiggling of a minnow, the throat expansion and contraction of a frog, the respiratory motion of a grasshopper's abdomen, and the voluntary motion of a creature in propelling itself through the water.

The rubber strand which forms the controlling motor is wound up to the maximum degree by twisting it, whereby to maintain the highest tension possible and yet retain its elongated shape. The rubber strand is coated with a solution of glue coating that is soluble in water. The solution is applied to the rubber either before or after it has been wound. It is held in a twisted form until the glue dries.

When the bait is placed in the water the soluble glue coating formed thereon softens in a few seconds thereafter thereby allowing the rubber strand to unwind and expand. The unwinding will result in either a quick jerky series of motions simulating those of a hooked angleworm or it may unwind in a slow even motion depending upon the method of manufacture.

The unwinding is controlled as to its speed by varying the degree of water solubility of the glue or by coating the length of the rubber strand motor with uneven layers of glue or by varying the numbers of coatings of glue applied.

Moreover, the speed of unwinding may be controlled by applying to the length of the rubber strand, first an undercoating of a tacky, pliable, non-setting cement or adhesive that is insoluble in water, and then the coating of soluble glue that dries to a hard gelatinous covering. Such a cement may be made by dissolving natural rubber in a solvent, such as naphtha, and adding a mixture of equal amounts of rosin and castor oil in a large enough quantity to render the cement non-setting. Then this whole mixture is heated until it boils for about ten minutes to combine the ingredients. This cement, while allowing the twisted strand to unwind, gives a continuous resistance to the movement that makes its speed of unwinding slow and even.

Furthermore, the rubber strand motor's action and shape may be further determined by using a certain thickness of rubber band and by controlling the amount of tension maintained in the winding of the band.

One of the advantages of a rubber strand motor when used in fishing is that it can function either as an imitation angleworm or it can be applied to motivate decoy bait lures that resemble the form of living creatures.

Moreover, the motor can be so manufactured as to give the decoys the involuntary motions of the creatures represented or the voluntary struggle or swimming motions of the same for a predetermined length of time. It will outlast live bait, whereby the fisherman is not compelled to change his bait so often which changing scatters the fish and wastes his time.

Furthermore, the soluble glue on the rubber strand will allow in deep water fishing time for the bait to sink to the required depth without shortening the length of time that the motor is active. In shallow water or surface fishing, the bait may be dissolved in water before casting, whereby it will become active when it reaches the fishing water.

The object will be understood by referring to the drawings in which

Fig. 1 is a side elevation showing an imitation angleworm.

Fig. 2 is a side elevation showing the angleworm coated with more than one layer of soluble glue in certain areas.

Fig. 3 is a side elevation showing the appearance of the angleworm after one layer of glue has dissolved.

Fig. 4 is a side elevation showing a figure imitating a minnow.

Fig. 5 is a plan view of Fig. 4 looking from beneath.

Referring more particularly to the drawings the bait comprises a rubber strand 1 which is coated with a soluble glue coating 2. A piece of sponge rubber 3 is attached at one end of strand 1 by projecting said end through said sponge rubber 3 and fastening with a waterproof glue. The sponge rubber 3 will provide a suitable material through which the hook 4 may be impaled.

The rubber strand 1 will be twisted to its maximum degree and held in said twisted position by said glue coating 2. As shown in Figs. 1 to 3 inclusive the glue may be applied to said strand 1 either before or after twisting. In either case the strand 1 is held in twisted condition until the glue 2 dries or hardens.

When the fisherman drops the bait in the water the soluble glue coating 2 will in a few seconds dissolve and allow the rubber strand 1 to unwind. The unwinding will produce a continuous twisting and jerking motion much like the throes of an impaled angleworm.

The rubber strand 1 is allowed to contract from a stretched condition in the process of winding to an extremely twisted and lumped state, whereby it is much shorter in overall length after being twisted than it was before. This lumped state gives the strand more of an appearance of a live angleworm. Furthermore, by stretching the strand 1 before winding many more turns or twists may be made in it without breaking said strand 1.

Fig. 2 shows a certain modification wherein the soluble glue coating 2 is applied with two layers thereof at 10 in certain areas, whereby the length of time that the bait retains the overall potentiality of motion is greatly increased. There will be certain intervals of time when the bait has no motion until those portions covered with two coats of the glue dissolve or soften, whereby to simulate the action of the worm which does not move continually but only at intervals. Obviously, there may be applied a plurality of layers of glue to prolong the potentiality of motion.

Figs. 4 and 5 show a further modification employing a design that simulates a minnow 15. The design has a frame work comprising a head 16 and tail part 17 connected together by an arched shaped brace or keel 20 formed integral with said parts. A fin 21 is formed on the top part of brace 20. There is also a rearwardly disposed fishing hook 22 fastened to said brace 20. An eye hook 23 is screw threaded to the forward end on head 16 to which the fishing line 24 is attached.

A pliable jacket 25 is attached to brace 20 and covers both sides of the minnow 15. The jacket 25 will be colored to simulate a minnow and is provided with side fins 26, 26.

The bottom part of the minnow is left open at 27 to allow the water to reach the motor or rubber strand hereinafter mentioned and also to allow for replacing the rubber strand with a new one.

The means for propelling the minnow 15 through the water contemplates a motor or rubber strand 30 which is twisted to a maximum degree with one end attached to a stationary hook 31 screw mounted to the rear of head 16. The opposite end of rubber strand 30 is attached to the swiveled hook 32 having a loose fit in tail part 17, whereby to turn therein. A propeller 35 mounted on a circular base 36 is fastened to the outer projecting end of swiveled hook 32 by soldering or welding.

A soluble glue coating 37 is applied to the rubber strand 30. When the glue coating 37 dissolves in the water, the strand 30 will unwind and cause propeller 35 to revolve, thereby propelling the minnow 15 through the water.

A collar 40 is formed integral with swiveled hook 32 to aid in holding it from moving longitudinally.

The rubber strand 30 is stretched as much as possible for propulsion as stated above allowing the overall length after stretching to diminish only slightly, whereby said strand 30 will give the maximum number of turns to said propeller 35.

The above methods of propulsion will give a tremendous advantage to the fisherman over the usual method of pulling the bait by rod or reel or hand. Even when using a very flexible rod, the fisherman can not move the minnow through water currents at a rate similar to the free fish. What free motion the live minnow has will go towards trying to free itself from the hook and in hiding from the game fish. My motorized bait, on the other hand, gives the uneven, natural motion like that of the live creature under normal conditions and is limited in motion forward by the underwater currents as would be a free, live minnow. Also, the mechanical bait will not try to hide from the game fish or escape it, but while remaining in motion, makes a convenient prey for the game fish, and a perfect bait.

An important additional advantage of this bait is that it can be directed toward a certain area, by aiming it properly, and it will move itself there. Thus, places can be fished which, by reason of natural obstructions, are otherwise inaccessible to the fisherman, and areas can be fished without disturbing the water by the entry of boat or the fisherman's boots.

Having thus described my invention, what I claim as new and desire to secure by Letters Patent is as follows:

In a fish bait, a twisted rubber strand and a water soluble glue coating formed on said strand, whereby to cause said strand to simulate the motions of a live bait when immersed in water.

WILLIAM P. HORTON.

REFERENCES CITED

The following references are of record in the file of this patent:

UNITED STATES PATENTS

| Number | Name | Date |
|---|---|---|
| 726,020 | Bryan | Apr. 21, 1903 |
| 2,182,996 | Shepherd | Dec. 12, 1939 |

FOREIGN PATENTS

| Number | Country | Date |
|---|---|---|
| 128,073 | Great Britain | June 19, 1919 |